United States Patent
MacKenzie et al.

[11] 3,894,002
[45] July 8, 1975

[54] SUBSTITUTED NAPHTHYLALKYLENE LACTAMIMIDES

[75] Inventors: Robert D. MacKenzie; Thomas R. Blohm; Edward M. Roberts, all of Cincinnati, Ohio

[73] Assignee: Richardson-Merrell Inc., Wilton, Conn.

[22] Filed: Aug. 9, 1973

[21] Appl. No.: 386,997

Related U.S. Application Data
[63] Continuation-in-part of Ser. No. 143,258, May 13, 1971, abandoned.

[52] U.S. Cl.... 260/239 B; 260/239 BE; 260/293.62; 260/294.8 C; 260/295 F; 260/296 B; 260/326.33; 260/326.5 C; 260/326.85; 260/326.9; 260/570.8 R; 424/244; 424/263; 424/267; 424/274
[51] Int. Cl.. C07d 27/04; C07d 29/28; C07d 41/08
[58] Field of Search....... 260/326.9, 239 BE, 239 B, 260/293.62, 326.5 C, 326.85, 296 B

[56] References Cited
UNITED STATES PATENTS
3,378,438    4/1968    Gatzi................................ 260/239 B

*Primary Examiner*—Alton D. Rollins
*Attorney, Agent, or Firm*—George W. Rauchfuss, Jr.; Eugene O. Retter

[57] ABSTRACT
Compounds possessing hypoglycemic, anticoagulant and diuretic activity are represented by compounds of the following formula

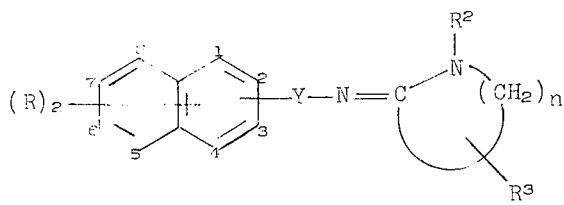

Formula I wherein each R is hydrogen, halogen such as chlorine, fluorine or bromine, trifluoromethyl, a straight or branched alkyl chain of from 1 to 12 carbon atoms, alkoxy of from 1 to 3 carbon atoms, or nitro, and each R may be the same or different; Y is a straight or branched alkylene chain of from 1 to 6 carbon atoms and is optionally substituted with phenyl or substituted phenyl wherein the substituents on the substituted phenyl are selected from halogen such as fluorine, chlorine, bromine or iodine or lower alkyl of from 1 to 3 carbon atoms; $R^2$ is hydrogen or lower alkyl of from 1 to 4 carbon atoms; $R_3$ is hydrogen, lower alkyl of from 1 to 4 carbon atoms or halogen such as chlorine, fluorine, bromine or iodine; and $n$ is an integer of from 3 to 11.

13 Claims, No Drawings

SUBSTITUTED NAPHTHYLALKYLENE LACTAMIMIDES

This application is a continuation-in-part of our earlier filed co-pending application Ser. No. 143,258 filed May 13, 1971, and now abandoned.

FIELD OF INVENTION

This invention relates to novel substituted naphthylalkylene lactamimide compounds and more particularly to said novel compounds having anticoagulant utility and additionally hypoglycemic and diuretic activity.

SUMMARY OF INVENTION

The novel compounds of this invention are represented by those having the following general formula

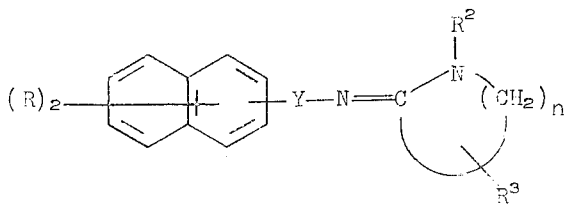

wherein each R is hydrogen, halogen such as chlorine, fluorine or bromine, trifluoromethyl, a straight or branched alkyl chain of from 1 to 12 carbon atoms, alkoxy of from 1 to 3 carbon atoms, or nitro, and each R may be the same or different; Y is a straight or branched alkylene chain of from 1 to 6 carbon atoms and is optionally substituted with phenyl or substituted phenyl wherein the substituents on the substituted phenyl are selected from halogen such as fluorine, chlorine, bromine or iodine or lower alkyl of from 1 to 3 carbon atoms; $R^2$ is hydrogen or lower alkyl of from 1 to 4 carbon atoms; $R^3$ is hydrogen, lower alkyl of from 1 to 4 carbon atoms or halogen such as chlorine, fluorine, bromine or iodine; and $n$ is an integer of from 3 to 11. Also included within the scope of the invention are the pharmaceutically acceptable acid addition salts of these compounds and the individual optical isomers where applicable.

DISCUSSION OF THE PRIOR ART

The compounds of the present invention are novel compounds having one or more biological activities rendering them useful in the pharmaceutical arts. The closest prior art known to applicants is a class of substituted iminopyrrolidines and iminopyrrolines disclosed in three United States patents granted to Rohm and Haas Company, namely, U.S. Pat. Nos. 3,109,848 of N. M. Bortnick et al., issued on Nov. 5, 1963; 3,121,093 of N. M. Bortnick et al., issued on Feb. 11, 1964; and 3,132,151 of N. M. Bortnick et al., issued on May 5, 1964. The compounds disclosed in these patents are stated to be useful as fungicides, aphicides and miticides.

DETAILED DESCRIPTION OF INVENTION

For convenience and uniformity we have represented and named all compounds described in the disclosure as substituted 2-iminoperhydroazacarbocyclics, as represented by Formula I. It is known, however, that compounds of this type as acid addition salts may also be represented by the tautomeric form illustrated by the following Formula II;

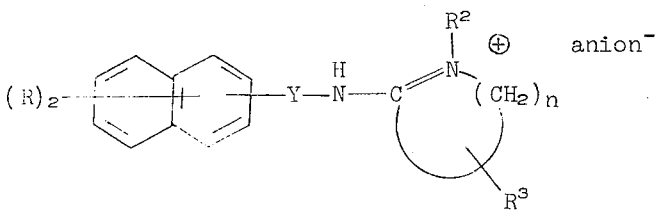

This tautomerism has been discussed by R. Kwok and P. Pranc, J. Org. Chem. 32, 740 (1967). Structures of this formula could be named differently. In solution, under the conditions of the therapeutic utility, the proportion of each tautomeric form, or the delocalization of the charge between the two nitrogen atoms, will be dependent upon numerous factors including the nature of the substituents, the pH of the medium, and the like. This equilibrium state is conveniently depicted by the following Formula III:

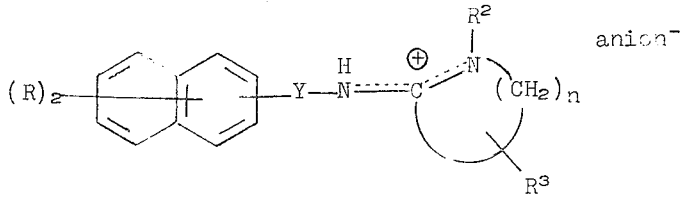

It is understood that this disclosure relates to compounds represented or named in either tautomeric form.

Preferred compounds of this invention are compounds of the following type:

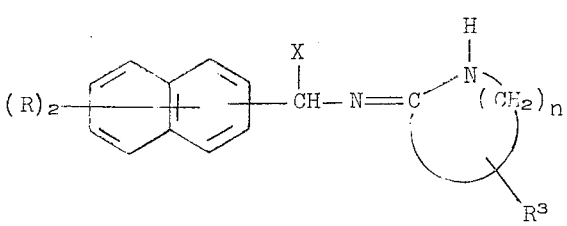

wherein each R has the meaning defined hereinbefore, $R^3$ is hydrogen, X is lower alkyl of from 1 to 5 carbon atoms, phenyl or phenyl substituted with halogen or lower alkyl of from 1 to 3 carbon atoms and $n$ is an integer of from 3 to 6.

Each of the symbols R in the compounds of the above Formulas I, II, III and IV is either hydrogen, halogen such as chlorine, bromine or fluorine, trifluoromethyl, a straight or branched alkyl radical of from 1 to 12 carbon atoms, such as, for example, methyl, ethyl, propyl, butyl, octyl, decyl, dodecyl and the like, nitro or an alkoxy radical of from 1 to 3 carbon atoms, such as, for example, methoxy, ethoxy or propoxy. Each R may be the same or may be different and may be located at any suitable position on the naphthyl radical.

The symbol Y in the compounds of the above Formulas I, II and III is a straight or branched alkylene chain of from 1 to 6 carbon atoms, such as, for example, methylene, 1,1-ethylene, 1,2-ethylene, 1,3-propylene, 1,1-butylene, 1,4-butylene, 1,5-pentylene, 1,6-hexylene, 2-methyl-1,4-butylene, 2-ethyl-1,4-butylene, 3-methyl-1,5-pentylene and the like; or such alkylene radicals substituted with phenyl or substituted phenyl wherein the substituents on the substituted phenyl are selected from halogen, such as, for example, chlorine, fluorine, bromine or iodine, or lower alkyl of from 1 to 3 carbon atoms such as methyl, ethyl or propyl.

The symbol $R^2$ in Formulas I, II and III is hydrogen or lower alkyl of from 1 to 4 carbon atoms such as methyl, ethyl, propyl or butyl.

In Formulas I, II and III the symbol $R^3$ is hydrogen, lower alkyl of from 1 to 4 carbon atoms, such as, for example, methyl, ethyl, propyl or butyl, or halogen, such as, for example, chlorine, fluorine, bromine or iodine.

The alkylene lactamimide function, that is,

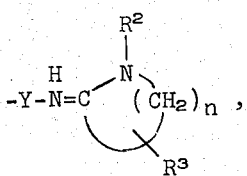

of Formulas I, II and III, or

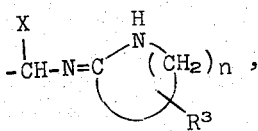

of Formula IV may be attached at any position of the naphthalene ring.

As examples of compounds of this invention there may be mentioned, for example,
hexahydro-2-(1-naphthylmethylimino)azepine hydrochloride
hexahydro-2-[1-(2-methyl)naphthylmethylimino]azepine hydrochloride
2-[1-(1naphthyl)ethylimino]piperidine hydrochloride,
2-[1-(1-naphthyl)ethylimino]octahydroazocine hydrochloride,
2-(6-bromo-2-methoxy-1-naphthylmethylimino)azacyclotridecane, and
2-[1-(5,8-dimethyl-1-naphthyl)ethylimino]hexahydroazepine hydrochloride.

As examples of preferred compounds there may be mentioned, for example,
hexahydro-2-[1-(1-naphthyl)ethylimino]azepine hydrochloride,
2-[1-(2-naphthyl)ethylimino]hexahydroazepine hydrochloride,
2-[1-(4-chloro-1-naphthyl)ethylimino]hexahydroazepine hydrochloride,
2-[1-(5,8-dimethyl-1-naphthyl)ethylimino]hexahydroazepine hydrochloride,
2-[2-methyl-1-(1-naphthyl)propylimino]hexahydroazepine hydrochloride,
levo-2-[1-(1-naphthyl)ethylimino]octahydroazocine hydrochloride,
hexahydro-2-[(o-methyl-α-[1-naphthyl]benzyl)imino]azepine hydrochloride,
2-[(α-[4-fluoro-1-naphthyl]benzyl)imino]piperidine hydrochloride.

Pharmaceutically acceptable acid addition salts of the base compounds of this invention are those of any suitable inorganic or organic acids. Suitable inorganic acids are, for example, hydrochloric, hydrobromic, sulfuric or phosphoric acids and the like. Suitable organic acids are, for example, carboxylic acids such as acetic, propionic, glycolic, lactic, pyruvic, malonic, succinic, fumaric, malic, tartaric, citric, ascorbic, maleic, hydroxymaleic, benzoic, hydroxybenzoic, phenylacetic, cinnamic, salicylic, 2-phenoxybenzoic and the like, or sulfonic acids such as methane sulfonic, 2-hydroxyethane sulfonic acid and the like.

It compounds been found that the novel compounds of this invention, including the acid addition salts and individual optical isomers where applicable, possess anticoagulant utility. In addition to their anticoagulant activity these compounds also possess hypoglycemic and diuretic activity. These compounds can be used in the form of pharmaceutical preparations which contain the novel compounds suitable for oral or parenteral administration. The quantity of compound in the unit dosage can vary over a wide range to provide from about 1.0 mg/kg to about 100 mg/kg of body weight of the patient per dose to achieve the desired effect. The desired anticoagulant effect can be obtained, for example, in a 70 kg subject by administration of 25 to 500 mg. of the active ingredient 1 to 4 or more times daily.

The utility of the compounds of this invention is illustrated by the following. The compound of Example 1 demonstrated in vitro an 80% inhibition of adenosine diphosphate induced platelet aggregation in human platelet rich plasma when 100 μg of compound was added to each milliliter of plasma. When 25 mg/kg of body weight of the compound of Example 13 was orally administered to rats the percent of urine excretion measured in milliliters was increased by 203% in 5 hours over that of a control group. When the third compound of Example 5 was administered to rats at 50 mg/kg of body weight a 38% reduction in plasma glucose from control resulted.

The compound of this invention are prepared by reacting an excess of a lactim ether of the formula

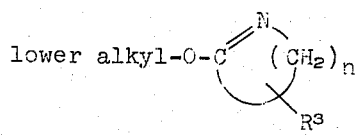

with a primary amine of the following formula

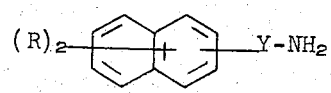

in a manner reported by R. E. Benson and T. L. Cairns, J. Am. Chem. Soc. 70, 2115–8 (1948). The various symbols, that is, n, $R^3$, R and Y have the meanings defined hereinbefore and lower alkyl may be methyl, ethyl or the like. This reaction may be carried out either in the presence of or absence of a solvent. When a solvent is used it is preferred that a lower alcohol such as methanol or ethanol be used; however, other solvents such as benzene, toluene and the like are suitable. A basic or acidic catalyst such as a tertiary amine or hydrogen chloride may be added to the reaction mixture. In general it is preferred that the hydrochloride salt of the amine be used in the reaction. The temperature of the reaction can vary from −40°C. to 180°C., and the preferred temperature is from about 15 to about 25°C. The reaction time varies from about 1 hour to about 60 days being dependent upon the temperature of the reaction, the reactant primary amine, and more particularly on the degree of steric hindrance of the amine since highly sterically hindered amines react very slowly.

The lactim ethers which find use in this reaction may be prepared from commercially available corresponding lactams by methods known in the art. For example, by reaction of an appropriate lactam with dimethyl sulfate in a solvent such as benzene, toluene, xylene or the like at the reflux temperature of the solvent for 2–24 hours the corresponding O-methyllactim ether is obtained.

The amines, either as the free base or the hydrochloride salt, which find use in this invention may be prepared by several known methods. For example, a particularly useful method is the Leuckart reaction whereby the appropriate naphthone derivative is heated with ammonium formate to a temperature of about 180° to 200°C. for 2 to 12 hours to give the desired amine. The naphthone derivative may be obtained by a standard Friedel-Crafts reaction of the appropriately substituted naphthalene with a suitable acylhalide, or by a Grignard reaction of a suitable alkyl- or arylmagnesium halide with a naphthalene-nitrile. The Grignard complex formed may also be reduced in situ with $LiAlH_4$ to the amine thereby avoiding the Leuckart reaction.

Similarly the above reaction may be carried out by using known thiolactim ethers such as S-methylthiocaprolactim [H. Behringer and H. Meier, Ann. 607, 67–91 (1957)], or by using thiolactams wherein the latter case it may be advantageous to employ a catalyst such a mercury or silver oxide or cyanide [J. A. Guatier and J. Renault, C. R. Acad. Sci. 234, 2081 (1952)].

The components of this invention may also be prepared using a complex of an appropriate lactam with phosphorous oxychloride, phosgene, borontrifluoride etherate, dimethyl sulfate, hydrogen halide or a combination of two or more such reagents. This reaction has been studied by H. Bredereck in a series of articles in Chem. Ber., 1953–1968, particularly in volume 94, 2278 (1961) and volume 97, 1403 (1964). The complex formed is reacted with an appropriate primary amine described hereinabove in an aromatic hydrocarbon solvent such as benzene, toluene or xylene or an alkyl polyhalide solvent such as carbon tetrachloride, chloroform, methylene chloride, tetrachloroethylene or the like. The reaction temperature is limited by the boiling point of the solvent, however, in some cases it is advantageous to carry out the reaction at room temperature or with cooling at 0° to −40°C. depending on the reactants.

Also by catalytic hydrogenation of an appropriate aminopyridine derivative as described by T. B. Grave, J. Am. Chem. Soc. 46, 1460 (1924), M. Freifelder et al., J. Org. Chem. 29, 3730 (1964) and L. Birkofer, Ber. 75, 429 (1942), compounds of this invention containing a pentamethylenimine moiety may be obtained.

EXAMPLES

Representative compounds of the invention and their preparation are illustrated in the following specific examples.

EXAMPLE 1

Hexahydro-2-[1-(1-naphthyl)ethylimino]azepine hydrochloride

A mixture of 50.0 g. of α-(1-naphthyl)ethylamine hydrochloride and 37.0 g. of O-methylcaprolactim in 200 ml. of anhydrous ethanol was stirred at room temperature for 3 days. The precipitate which formed was filtered, recrystallized from anhydrous ethanol and dried to give 33.0 g. of the desired product, M.P. 251.5°–252.5°C.

The title compound is also prepared from the free base of the amine with the addition of one equivalent of hydrogen chloride to the reaction mixture whereby the hydrochloride salt is formed in situ.

EXAMPLE 2

O-Methylvalerolactim

To a refluxing solution of 100 g (1.01 moles) of valerolactam in 350 ml of dry benzene was added dropwise 125 g (0.99 mole) of dimethyl sulfate. After refluxing overnight the mixture was treated with saturated potassium carbonate solution, dried and the solvent was evaporated. The product was distilled at 20 mm, B.P. 55°–57°C.

EXAMPLE 3

Following the procedure of Example 2 only substituting for valerolactam, the appropriate molar equivalent amount of butyrolactam (2-pyrrolidone), enantholactam or caprylolactam the following compounds were prepared:

O-methylbutyrolactim, B.P. 65°–67°C. (100 mm),
O-methylenantholactim, B.P. 48°–53°C. (2.0 mm),
O-methylcaprylolactim, B.P. 44°–46°C. (0.5 mm).

EXAMPLE 4

Following the procedure of Example 1, only substituting for α-(1-naphthyl)ethylamine the appropriate molar equivalent amounts of 1-naphthylmethylamine or 2-methyl-1-naphthylmethylamine the following compounds were prepared:

hexahydro-2-(1-naphthylmethylimino)azepine hydrochloride, M.P. 214°–214.5°C.
hexahydro-2-[1-(2-methyl)naphthylmethylimino]azepine hydrochloride, M.P. 223°–227.5°C.

EXAMPLE 5

Following the procedure of Example 1, only substituting for O-methylcaprolactim an equimolar amount of O-methylvalerolactim, O-methylbutyrolactim or O-methylenantholactim the following compounds were prepared:

2-[1-(1-naphthyl)ethylimino]piperidine hydrochloride, M.P. 258°–259°C.
2-[1-(1-naphthyl)ethylimino]pyrrolidine hydrochloride, M.P. 300°–300.5°C.
2-[1-(1-naphthyl)ethylimino]octahydroazocine hydrochloride, M.P. 234°–235.5°C.

EXAMPLE 6

2-[1-(1-Naphthyl)ethylimino]azacyclotridecane hydrochloride

To a solution of 21.7 g of 2-azacyclotridecanone in 200 ml of dry benzene was added dropwise 15.3 g. of phosphorous oxychloride. The mixture was stirred at room temperature for 4 hours under exclusion of atmospheric moisture after which 17.1 g of α-(1-naphthyl)ethylamine was added. Stirring was continued at room temperature for 1 hour then at reflux temperature for 4 hours. After standing overnight the mixture was washed with 2N NaOH then treated with 2N HCl which resulted in the formation of methylene chloride. The organic phase was dried over sodium sulfate and the solvent was evaporated. The resulting material was recrystallized from acetone and mixtures of methanol-acetone to give the desired product, M.P. 217°–219°C.

EXAMPLE 7

2-[1-(Naphthyl)ethylimino]octahydroazonine hydrochloride

Following the procedure described in Example 1 only substituting for O-methylcaprolactim the appropriate molar equivalent amount of D-methylcaprylolactim, the desired product is obtained. This compound is also obtained by the procedure of Example 6 wherein the appropriate molar equivalent amount of 2-azacyclododecanone is substituted for 2-azacyclotridecanone.

EXAMPLE 8

Following the procedure of Example 6 only substituting for 2-azacyclotridecanone the appropriate molar equivalent amount of 3-chlorocaprolactam or 1-methyl-2-piperidone, the following compounds are obtained:

3-chloro-2-[1-(1-naphthyl)ethylimino]hexahydroazepine hydrochloride,
1-methyl-2-[1-(1-naphthyl)ethylimino]piperidine hydrochloride.

EXAMPLE 9

2-[1-(2-naphthyl)ethylimino]hexahydroazepine hydrochloride

Following the procedure of Example 1 only substituting for α-(1-naphthyl)ethylamine, the appropriate molar equivalent amount of α-(2-naphthyl)ethylamine, [A. W. Ingersoll et al., J. Am. Chem. Soc. 58, 1808–1811 (1936)] the desired product was obtained, M.P. 251°–252°C.

EXAMPLE 10

Following the procedure of Example 1 only substituting for α-(1-naphthyl)ethylamine the appropriate molar equivalent amount of 5-nitro-1-naphthalenemethylamine [P. Kristian et al., Coll. Czech. Chem. Commun. 30, 3658-63 (1965)] or 4-methoxy-α-methylnaphthalenemethylamine [B. Day and S. Rajagopalan, Arch. Pharm. 277, 359–74 and 377–98 (1938)], the following compounds are obtained:

hexahydro-2-[1-(5-nitronaphthyl)methylimino]azepine hydrochloride,
hexahydro-2-[1-(4-methoxy-1-naphthyl)ethylimino]azepine hydrochloride.

EXAMPLE 11

2-[2-(6-Methoxy-1-naphthyl)ethylimino]piperidine hydrochloride

Following the procedure of Example 1 only substituting for α-(1-naphthyl)ethylamine and O-methylcaprolactim the appropriate molar equivalent amounts of 6-methoxy-1-naphthaleneethylamine (S. V. Kessar et al., Tetrahedron Letters 1965, 3245) and O-methylvalerolactim, respectively, the desired product is obtained.

EXAMPLE 12

2-(6-Bromo-2-methoxy-1-naphthylmethylimino)azacyclotridecane hydrochloride

Following the procedure of Example 6 only substituting for α-(1-naphthyl)ethylamine the appropriate molar equivalent amount of 6-bromo-2-methoxy-1-naphthalenemethylamine (R. D. Haworth et al., J. Chem. Soc. 1952, 2857–8) the desired product is obtained.

EXAMPLE 13

2-[1-(4-Chloro-1-naphthyl)ethylimino]hexahydroazepine hydrochloride

A. A mixture of 50.0 g of 4'-chloro-1'-acetonaphthone which was prepared by the method described by D. T. Mowry et al., J. Am. Chem. Soc. 68, 1105 (1946), and 49.0 g of ammonium formate was slowly heated to 150°–155°C. with stirring. After the initial foaming had subsided the temperature of the heating bath was raised to 180°–195°C. for a period of 5 hours. Upon cooling, the mixture was treated with several portions of water then benzene. To the residue was added 31 ml of concentrated HCl. The mixture was refluxed for 1 hour, cooled and neutralized with 40% sodium hydroxide solution. The product, 4-chloro-α-methyl-1-naphthylmethylamine was extracted into ether, converted to the hydrochloride salt and recrystallized from acetonitrilemethanol, M.P. 293°–294°C.

B. A mixture of 24.2 g. of 4-chloro-α-methyl-1-naphthyl-methylamine hydrochloride and 12.7 g of O-methylcaprolactim in 50 ml of anhydrous ethanol was stirred at room temperature for 3 days. The mixture first became homogeneous then a precipitate formed which was recrystallized from acetonitrilemethanol to give the desired product, M.P. 263°–265°C.

EXAMPLE 14

Following the procedure of Example 13 only substituting for 4'-chloro-1'-acetonaphthone the appropriate molar equivalent amounts of 4'-fluoro-1'-acetonaphtone [S. Berkovic, Israel J. Chem. 1, 1–11 (1963)] or 7'-fluoro-1'-acetonaphthone [E. Jensen, Israel J. Chem. 3, 79–82 (1965)] the following compounds are obtained:

2-[1-(4-fluoro-1-naphthyl)ethylimino]hexahydroazepine hydrochloride,
2-[1-(7-fluoro-1-naphthyl)ethylimino]hexahydroazepine hydrochloride.

EXAMPLE 15

2-[1-(5,8-Dimethyl-1-naphthyl)ethylimino]piperidine hydrochloride

A. To a vigorously stirred suspension of 50.0 g of anhydrous aluminum chloride in 225 ml of carbon tetrachloride cooled to 0°–10°C. was added dropwise 29.4 g of acetyl chloride then 50.0 g of 1,4-dimethylnaphthalene. The mixture was stirred for 4 hours then poured onto ice and dilute HCl. The organic phase was separated, washed with 2N HCl and 10% $Na_2CO_3$ solution, dried over sodium sulfate and the solvent evaporated. The resulting oil was distilled at 0.5 mm, B.P. 145°–165°C. to give 5',8'-dimethyl-1'-acethonapthone which was converted to α,5,8-trimethyl-1-naphthalenemethylamine hydrochloride, M.P. 270°–271°C., by the Leuckart reaction as described in Example 13(A).

B. Following the procedure of Example 13(B), only substituting for O-methylcaprolactim and 4-chloro-α-methyl-1-naphthylmethylamine HCl the appropriate molar equivalent amounts of O-methylvalerolactim and α,5,8-trimethyl-1-naphthalenemethylamine HCl the desired product was obtained, M.P. 205°–207°C. (dec.).

EXAMPLE 16

2-[1-(5,8-dimethyl-1-naphthyl)ethylimino]hexahydroazepine hydrochloride

Following the procedure of Example 15(B), only substituting for O-methylvalerolactim the appropriate molar equivalent amount of O-methylcaprolactim, the desired product was obtained, M.P. 265°–267°C. (dec.).

EXAMPLE 17

2-[1-(4-Dodecyl-1-naphthyl)ethylimino]hexahydroazepine hydrochloride

Following the procedure of Example 15(A), only substituting for 1,4-dimethylnaphthalene the appropriate molar equivalent amount of 1-(1-naphthyl)dodecane (D. G. Anderson et al., J. Chem. Soc. 1953, 443–450), 4-dodecyl-α-methylnaphthalenemethylamine hydrochloride is obtained.

By the procedure of Example 13(B), only substituting for 4-chloro-α-methyl-1-naphthylmethylamine hydrochloride the appropriate molar equivalent amount of 4-dodecyl-α-methylnaphthalenemethylamine hydrochloride the desired product is obtained.

EXAMPLE 18

2-[2-methyl-1-(1-naphthyl)propylimino]hexahydroazepine hydrochloride

A Grignard reagent was prepared from 31.8 g of magnesium turnings and 161.0 g of isopropyl bromide in 250 ml of anhydrous ether. To this reagent 50.0 g of 1-cyanonaphthalene in 800 ml of dry toluene was added dropwise. After the exothermic reaction subsided the mixture was heated until the boiling temperature of toluene was reached and all the ether had evaporated. The mixture was refluxed overnight, cooled and 600 ml of 6N HCl was added with care. The resulting mixture was refluxed for 6 hours, and the organic phase separated. The crude product obtained from the organic phase was distilled at 0.6 mm, B.P. 160°–170°C. to give 56.2 g of 2-methyl-1'-propionaphthone, $N_D^{25}$ 1.5925, which was converted to α-isopropyl-1-naphthalene methylamine hydrochloride, M.P. 288°–289°C. by the procedure of Example 13(A).

Following the procedure of Example 13(B) only substituting for 4-chloro-α-methyl-1-naphthylmethylamine hydrochloride the appropriate molar equivalent amount of α-isopropyl-1-naphthalenemethylamine hydrochloride, the desired product was obtained, M.P. 290°–291°C. (dec.).

EXAMPLE 19

Hexahydro-2-[1-(2-trifluoromethyl-1-naphthyl)ethylimino]azepine hydrochloride

Following the procedure of Example 18, 2'-trifluoromethyl-1'-acetonaphthone is prepared from 2-trifluoromethyl-1-naphthonitrile [L. Yagupol'skii and Yu Fialkov, Zhur. Obschei Khim 29, 3082 (1959)] and is converted to α-methyl-2-trifluoromethyl-1-naphthalenemethylamine hydrochloride by the procedure of Example 13(A). By the procedure of Example 13(B) only substituting for 4-chloro-α-methyl-1-naphthylmethylamine hydrochloride the appropriate molar equivalent amount of α-methyl-2-trifluoromethyl-1-naphthalenemethylamine hydrochloride, the desired product is obtained.

EXAMPLE 20

Hexahydro-2-[1-(1-naphthyl)pentylimino]azepine hydrochloride

Following the procedure of Example 18 and using butylmagnesium bromide, n-butyl 1-naphthyl ketone was prepared, B.P. 185°–189°C. (0.5 mm) and subsequently converted to α-n-butyl-1-naphthylmethylamine hydrochloride, M.P. 246°–247°C., by the procedure of Example 13(A) with the exception that a higher temperature (200°C.) was used.

By the procedure of Example 13(B), only substituting for 4-chloro-α-methyl-1-naphthylmethylamine hydrochloride the appropriate molar equivalent amount of α-n-butyl-1-naphthylmethylamine hydrochloride, the desired product was obtained, M.P. 200°–201°C.

EXAMPLE 21

Hexahydro-2-[1-(6-n-hexyl-2-naphthyl)hexylimino]azepine hydrochloride

Following the procedure of Example 13(A), only substituting for 4'-chloro-1'-acetonaphthone the appropriate molar equivalent amount of n-pentyl 6 n-hexyl-2-naphthyl ketone (B. Bannister and B. Elsner, J. Chem. Soc. 1951, 1061), -n-hexyl-α6-N-hexyl-α-n-pentyl-2-naphthylmethylamine hydrochloride is obtained.

By the procedure of Example 1 only substituting for α-(1-naphthyl)ethylamine hydrochloride the appropriate molar equivalent amount of 6-n-hexyl-α-n-pentyl-2-naphthylmethylamine hydrochloride, the desired product is obtained.

EXAMPLE 22

Following the procedure of Example 1 only substituting for α-(1-naphthyl)ethylamine the appropriate molar equivalent amounts of β-isopropyl-1-naphthaleneethylamine (H. Pacheco and R. Gaige, Bull. Soc. Chim. France 1965, 861–868) and 1-naphthalenepentylamine [C. Skinner et al., J. Am. Chem. Soc. 79, 2843-6 (1957)] the following compounds are obtained:
hexahydro-2-[2-isopropyl-2-(1-naphthyl)ethylimino]azepine hydrochloride,
hexahydro-2-[5-(1-naphthyl)pentylimino]azepine hydrochloride.

EXAMPLE 23

5-tert-Butylhexahydro-2-[1-(1-naphthyl)ethylimino]azepine hydrochloride

Following the procedure of Example 6, only substituting for 2-azacyclotridecanone, the appropriate molar equivalent amount of 5-tert-butylcaprolactam, the desired product was prepared, M.P. >300°C.

EXAMPLE 24

2-[(α-(4-Fluoro-1-naphthyl]benzyl)imino]hexahydroazepine hydrochloride

A. To 4-fluoro-1-naphthylmagnesium bromide, prepared from 2.7 g of magnesium turnings and 25.0 g of 1-bromo-4-fluoronaphthalene in 100 ml of anhydrous ether was added dropwise 9.6 g of benzonitrile. The mixture was refluxed for 1 hour and allowed to stand overnight. The resulting heterogeneous mixture of ketimine salt was added in portions to a slurry of 4.2 g of lithium aluminum hydride under 500 ml of anhydrous ether, and the mixture was stirred and refluxed overnight. The mixture was then decomposed by carefully adding over a period of 4 hours the following: 4.2 ml of water, 4.2 ml of 3N NaOH and 12.6 ml of water. The resulting precipitate of inorganic material was filtered off and washed with ether. The filtrate was acidified with 2N HCl, and the resulting precipitate was collected and recrystallized twice from isopropanol-water to give 14.0 g of α-[1-(4-fluoronaphthyl)]benzylamine hydrochloride, M.P. 290°–292°C. (dec.).

B. Following the procedure of Example 1, only substituting for α-(1-naphthyl)ethylamine hydrochloride the appropriate molar equivalent amount of α-[1-(4-fluoronaphthyl)]benzylamine hydrochloride the desired product was obtained, M.P. 278°–279°C. (dec.).

EXAMPLE 25

2-[(α-[4-Fluoro-1-naphthyl]benzyl)imino]piperidine hydrochloride

Following the procedure of Example 1 only substituting for α-(1-naphthyl)ethylamine hydrochloride and O-methylcaprolactim, the appropriate molar equivalent amounts of α-[1-(4-fluoronaphthyl)]benzylamine hydrochloride and O-methylvalerolactim, the desired product was obtained, M.P. 197°–199°C.

EXAMPLE 26

Hexahydro-2-[(o-methyl-α-[1-naphthyl]benzyl)imino]azepine hydrochloride

A. Following the procedure of Example 24(A) only substituting for 4-fluoro-1-naphthylmagnesium bromide an appropriate amount of 1-naphthylmagnesium bromide, prepared from 1-bromonaphthalene and magnesium turnings, and also substituting for benzonitrile an appropriate amount of o-methylbenzonitrile, o-methyl-α-(1-naphthyl)benzylamine hydrochlorde, was prepared.

B. A slurry of 14.2 g of o-methyl-α-(1-naphthyl)benzylamine hydrochloride in 27 ml of O-methylcaprolactim was allowed to stand at room temperature for 3 days with occasional stirring. A small amount of anhydrous ethanol was added to keep the mixture in a stirrable slurry. After cooling, the resulting solid was collected, washed with ether and recrystallized from methanol-acetone to give the desired product. M.P. 290°–292°C. (dec.).

EXAMPLE 27

Hexahydro-2-[(o-methyl-α-[2-naphthyl]benzyl)imino]azepine hydrochloride

Following the procedure of Example 26(A), only substituting for 1-bromonaphthalene an appropriate amount of 2-bromonaphthalene, o-methyl-α-(2-naphthyl)benzylamine hydrochloride was obtained and substituted for o-methyl-α-(1-naphthyl)benzylamine hydrochloride in Example 26(B) to give the desired product, M.P. 308°–309°C.

EXAMPLE 28

Hexahydro-2-[(1-[1-naphthyl]propyl)imino]azepine hydrochloride

A slurry of 20 g (0.0905 mole) of powdered 1(1-naphthyl)propylamine hydrochloride and 20 ml of O-methylcaprolactim is allowed to stand overnight at room temperature with occasional stirring for 4 days during which time sufficient ethanol was added to maintain the slurry. The slurry is then cooled to −20°C., and a precipitate forms after about four hours. The precipitate is collected, washed with absolute ethanol and dried, after which it is recrystallized several times from acetone-methanol and dried to give hexahydro-2-[(1-[1-naphthyl]propyl)imino]azepine hydrochloride, M.P. 283°–284°C.

EXAMPLE 29

2-[(2,2-Dimethyl-1-[1-naphthyl]propyl)imino]hexahydroazepine hydrochloride

When in the procedure of Example A, 7.5 g (0.03 mole) of 1-(1-naphthyl)neopentylamine hydrochloride is substituted for 1-(1-naphthyl)propylamine hydrochloride, and 8 ml of O-methylcaprolactim is used, 2-[(2,2-dimethyl-1-[1-naphthyl]propyl)imino]hexahydroazepine hydrochloride is obtained, M.P. >300°C.

We claim:
1. A compound selected from
A. a compound of the formula

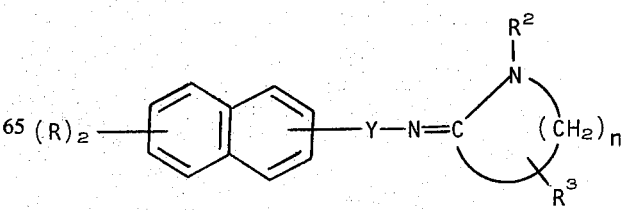

B. a pharmaceutically acceptable acid addition salt thereof, wherein each R is selected from the group consisting of hydrogen, halogen, trifluoromethyl, alkyl of from 1 to 12 carbon atoms, alkoxy of from 1 to 3 carbon atoms or nitro; Y is an alkylene chain of from 1 to 6 carbon atoms or

in which the phenyl moiety may be substituted with substituents selected from the group consisting of halogen or lower alkyl of from 1 to 3 carbon atoms; $R^2$ is selected from the group consisting of hydrogen or lower alkyl of from 1 to 4 carbon atoms; $R^3$ is selected from the group consisting of hydrogen, lower alkyl of from 1 to 4 carbon atoms or halogen; and n is a whole integer of from 3 to 11.

2. A compound of claim 1 wherein Y is

and X is lower alkyl of from 1 to 5 carbon atoms, $R^2$ is hydrogen, $R^3$ is hydrogen and n is a whole integer of from 3 to 6.

3. A compound of claim 3 wherein X is methyl.

4. A compound of claim 3 wherein each R is hydrogen.

5. A compound of claim 4 which is hexahydro-2-[1-(1-naphthyl)ehtylimino]azepine or a pharmaceutically acceptable acid addition salt thereof.

6. A compound of claim 4 which is 2-[1-(2-naphthyl)ethylimino]hexahydroazepine or a pharmaceutically acceptable acid addition salt thereof.

7. A compound of claim 4 which is 2-[1-(1-naphthyl)ethylimino]octahydroazocine or a pharmaceutically acceptable acid addition salt thereof.

8. A compound of claim 3 which is 2-[1-(4-chloro-1-naphthyl)ethylimino]hexahydroazepine or a pharmaceutically acceptable acid addition salt thereof.

9. A compound of claim 3 which is 2-[1-(5,8-dimethyl-1-naphthyl)ethylimino]hexahydroazepine or a pharmaceutically acceptable acid addition salt thereof.

10. A compound of claim 2 which is 2-[2-methyl-1-(1-naphthyl)propylimino]hexahydroazepine or a pharmaceutically acceptable acid addition salt thereof.

11. A compound of claim 1 wherein Y is

and X is phenyl or substituted phenyl and the substituents on the substituted phenyl ring are selected from halogen or lower alkyl of from 1 to 3 carbon atoms, $R^2$ is hydrogen, $R^3$ is hydrogen and n is a whole integer of from 3 to 6.

12. A compound of claim 11 which is hexahydro-2-[(o-methyl-α-[1-naphthyl]benzyl)imino]azepine or a pharmaceutically acceptable acid addition salt thereof.

13. A compound of claim 11 which is 2-[(α-[4-fluoro-1-naphthyl]benzyl)imino]piperidine or a pharmaceutically acceptable acid addition salt thereof.

* * * * *

UNITED STATES PATENT OFFICE
CERTIFICATE OF CORRECTION

PATENT NO. : 3,894,002
DATED : July 8, 1975
INVENTOR(S) : Robert D. MacKenzie, Thomas R. Blohm and
Edward M. Roberts It is certified that error appears in the above-identified patent and that said Letters Patent are hereby corrected as shown below:

In the Abstract, 12th line after the formula, "R3" should read "$R^3$". Column 1, after the formula, it should read "Formula 1". Column 2, after 3rd formula in column, it should read "Formula IV". Column 4, line 21, "It compounds been found" should read "It has been found"; line 49, "compound" should read "compounds"; line 55, it should read "Formula V"; line 65, it should read "Formula VI". Column 5, line 51, "a" should read "as"; line 53, "components" should read "compounds". Column 7, line 41, "D-methylcaprolactim" should read "O-methylcaprolactim". Column 9, line 2, "acetonaphtone" should read "acetonaphthone"; line 23, "acetnaphthone" should read "acetonaphthone". Column 10 " -n-hexyl-α6-N-hexyl-α-n-pentyl" should read "6-$\underline{n}$-hexyl-α-$\underline{n}$-pentyl". Column 12, line 65, after the formula, it should read "or". Column 13, claim 3, "compound of claim 3" should read "compound of claim 2"; claim 5, line 2, "ehtylimino" should read "ethylimino".

Signed and Sealed this sixth Day of January 1976

[SEAL]

Attest:

RUTH C. MASON
Attesting Officer

C. MARSHALL DANN
Commissioner of Patents and Trademarks